United States Patent
Sugaya

(10) Patent No.: US 10,607,372 B2
(45) Date of Patent: Mar. 31, 2020

(54) COSMETIC INFORMATION PROVIDING SYSTEM, COSMETIC INFORMATION PROVIDING APPARATUS, COSMETIC INFORMATION PROVIDING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/322,634

(22) PCT Filed: Jul. 8, 2016

(86) PCT No.: PCT/JP2016/070212
§ 371 (c)(1),
(2) Date: Dec. 28, 2016

(87) PCT Pub. No.: WO2018/008138
PCT Pub. Date: Jan. 11, 2018

(65) Prior Publication Data
US 2019/0197736 A1 Jun. 27, 2019

(51) Int. Cl.
*G06K 9/00* (2006.01)
*G06T 7/90* (2017.01)
*G06Q 30/06* (2012.01)
*G06T 7/00* (2017.01)
*G06K 9/62* (2006.01)
(Continued)

(52) U.S. Cl.
CPC ............ *G06T 7/90* (2017.01); *G06K 9/00228* (2013.01); *G06K 9/6215* (2013.01); *G06Q 30/06* (2013.01); *G06Q 30/0623* (2013.01); *G06Q 30/0643* (2013.01); *G06T 7/00* (2013.01); *G06T 11/001* (2013.01); *G06F 3/0482* (2013.01); *G06F 3/04847* (2013.01); *G06T 2200/24* (2013.01); *G06T 2207/10024* (2013.01); *G06T 2207/30201* (2013.01)

(58) Field of Classification Search
CPC ......... G06T 11/001; G06T 2207/30201; G06T 2200/24; G06T 2207/10024; G06T 7/90; G06T 7/00; G06K 9/00228; G06K 9/6215; G06Q 30/06; G06Q 30/0623; G06Q 30/0643; G06F 3/0482; G06F 3/04847
See application file for complete search history.

(56) References Cited

U.S. PATENT DOCUMENTS 10,321,747 B2 * 6/2019 Tamura .................. A45D 44/00
10,373,348 B2 * 8/2019 Sugaya ................. G06T 11/001
(Continued)

FOREIGN PATENT DOCUMENTS

JP 2007-257194 10/2007
JP 2008-003724 1/2008
(Continued)

*Primary Examiner* — Shaghayegh Azima
(74) *Attorney, Agent, or Firm* — Lex IP Meister, PLLC

(57) ABSTRACT

A cosmetic information providing system includes a first acquisition unit that acquires a first image 311 representing a face on which makeup with a first color has been performed, a determination unit that determines a cosmetic corresponding to the first color by analyzing the first image 311 acquired by the first acquisition unit, and an output unit that outputs information for identifying the determined cosmetic.

6 Claims, 14 Drawing Sheets

(51) Int. Cl.
    *G06T 11/00*     (2006.01)
    *G06F 3/0482*   (2013.01)
    *G06F 3/0484*   (2013.01)

(56) References Cited

U.S. PATENT DOCUMENTS

| | | | | |
|---|---|---|---|---|
| 2001/0037191 | A1* | 11/2001 | Furuta | G06Q 10/087 703/6 |
| 2003/0007684 | A1* | 1/2003 | Kato | A45D 44/005 382/165 |
| 2012/0044335 | A1* | 2/2012 | Goto | A45D 44/005 348/77 |
| 2013/0271484 | A1* | 10/2013 | Aoki | A45D 44/005 345/593 |
| 2013/0271485 | A1* | 10/2013 | Aoki | G06T 19/20 345/593 |
| 2014/0023231 | A1* | 1/2014 | Iwamoto | G06T 5/005 382/103 |
| 2015/0118655 | A1* | 4/2015 | Yamanashi | A45D 44/00 434/100 |
| 2015/0254500 | A1* | 9/2015 | Izumi | G06T 11/60 348/78 |
| 2015/0254501 | A1* | 9/2015 | Yamanashi | G06K 9/00268 348/78 |
| 2016/0106198 | A1* | 4/2016 | Yoshida | G01N 21/27 356/402 |
| 2016/0125624 | A1* | 5/2016 | Liu | G06K 9/00281 345/593 |
| 2016/0128450 | A1* | 5/2016 | Saito | G06F 3/011 345/633 |
| 2016/0143423 | A1 | 5/2016 | Yamanashi et al. | |
| 2016/0148532 | A1 | 5/2016 | Yamanashi et al. | |
| 2017/0024918 | A1* | 1/2017 | Sugaya | G06T 11/00 |
| 2017/0256084 | A1* | 9/2017 | Iglehart | G06K 9/00221 |

FOREIGN PATENT DOCUMENTS

| | | |
|---|---|---|
| JP | 2009-251850 | 10/2009 |
| JP | 2010-017360 | 1/2010 |
| JP | 2012-113747 | 6/2012 |
| JP | 2014-149697 | 8/2014 |

* cited by examiner

FIG. 3

| Name of Cosmetic | Image Data | Product Information |
|---|---|---|
| Eye shadow A | Image 1 | Price: 5980 Yen ..... |
| Eye shadow B | Image 2 | Price: 4980 Yen ..... |
| Eye shadow C | Image 3 | Price: 3200 Yen ..... |
| Eye shadow D | Image 4 | Price: 4000 Yen ..... |
| ... | ... | ... |
| Lipstick E | ... | ... |
| ... | ... | ... |
| Cheek F | ... | ... |
| ... | ... | ... |

| Name of Cosmetic | | Color Information |
|---|---|---|
| Eye shadow A | — | C1 |
| Eye shadow B | Eye shadow C | C2 |
| Eye shadow D | — | C3 |
| ... | ... | ... |

| User ID | Type of Skin Color | Skill Level | Type of Makeup Tool | Favorite Brand Name |
|---|---|---|---|---|
| 001 | Yellow-based | 1 | Brush | x |
| ... | ... | ... | ... | ... |

| Name of Cosmetic | | Color Information | Similarity |
|---|---|---|---|
| Eye shadow A | — | C1 | 98 |
| Eye shadow B | Eye shadow C | C2 | 92 |
| Eye shadow D | — | C3 | 89 |
| ... | ... | ... | ... |

| Name of Cosmetic | | Color Information | Similarity | Priority |
|---|---|---|---|---|
| Eye shadow A | — | C1 | 98 | 1 |
| Eye shadow D | — | C3 | 89 | 2 |
| Eye shadow B | Eye shadow C | C2 | 92 | 3 |
| ... | ... | ... | ... | ... |

FIG. 21

| Name of Cosmetic | Image Data | Product Information | Descriptive Information of Makeup Method |
|---|---|---|---|
| Eye shadow A | Image 1 | Price: 5980 Yen ..... | ... |
| Eye shadow B | Image 2 | Price: 4980 Yen ..... | ... |
| Eye shadow C | Image 3 | Price: 3200 Yen ..... | ... |
| Eye shadow D | Image 4 | Price: 4000 Yen ..... | ... |
| ... | ... | ... | ... |
| Lipstick E | ... | ... | ... |
| ... | ... | ... | ... |
| Cheek F | ... | ... | ... |
| ... | ... | ... | ... |

| Name of Cosmetic | Image Data | Product Information | Name of Makeup Tool | Image Data | Product Information |
|---|---|---|---|---|---|
| Eye shadow A | Image 1 | Price: 5980 Yen ..... | Brush G | Image 5 | Price:1200 Yen ....... |
| Eye shadow B | Image 2 | Price: 4980 Yen ..... | Tip F | Image 6 | Price:1000 Yen ....... |
| Eye shadow C | Image 3 | Price: 3200 Yen ..... | ... | ... | ... |
| Eye shadow D | Image 4 | Price: 4000 Yen ..... | ... | ... | ... |
| ... | ... | ... | ... | ... | ... |
| Lipstick E | ... | ... | ... | ... | ... |
| ... | ... | ... | ... | ... | ... |
| Cheek F | ... | ... | ... | ... | ... |
| ... | ... | ... | ... | ... | ... |

135

COSMETIC INFORMATION PROVIDING SYSTEM, COSMETIC INFORMATION PROVIDING APPARATUS, COSMETIC INFORMATION PROVIDING METHOD, AND PROGRAM

TECHNICAL FIELD

The present invention relates to a cosmetic information providing system, a cosmetic information providing apparatus, a cosmetic information providing method, and a program.

BACKGROUND ART

Technologies for makeup simulation have been known. For example, Patent Document 1 describes a makeup simulation system for applying makeup processing to a moving image obtained by photographing a user's face. Patent Document 2 describes game apparatus for performing makeup simulation using a user's face image.

PRIOR ART DOCUMENT

Patent Document

Patent Document 1: Japanese Patent Application Publication No. 2012-113747
Patent Document 2: Japanese Patent Application Publication No. 2010-17360

SUMMARY OF THE INVENTION

Technical Problem

In the technology described in Patent Document 1, only predetermined makeup such as makeup using existing cosmetics can be simulated. However, a desired color of the user does not necessarily exist among colors included in the predetermined makeup. Therefore, in the technology described in Patent Document 1, it may be impossible to simulate the makeup using the desired color of the user or to obtain information about cosmetics corresponding to the desired color.

The technology described in Patent Document 2 is related to simply enjoy makeup simulation of the cosmetic. Even if favorite cosmetics are found as a result of the simulation, it is impossible to obtain information about cosmetics for implementing the makeup.

The present invention aims to provide information about a cosmetic corresponding to the desired color of the user.

Technical Solution

The present invention provides a cosmetic information providing system including a first acquisition unit that acquires a first image representing a face on which makeup with a first color has been performed, a determination unit that determines a cosmetic corresponding to the first color by analyzing the acquired first image, and an output unit that outputs information for identifying the determined cosmetic.

Effects of the Invention

According to the present invention, it is possible to provide the information about the cosmetic corresponding to the desired color of the user.

BRIEF DESCRIPTION OF THE DRAWINGS

FIG. 3 is a diagram showing an example of a product table 131.
FIG. 4 is a diagram showing an example of a color table 132.
FIG. 5 is a diagram showing an example of a user table 133.
FIG. 21 is a diagram showing an example of a product table 134 according to a modified example.
FIG. 22 is a diagram showing an example of a product table 135 according to a modified example.

DESCRIPTION OF REFERENCE NUMBERS

1: cosmetic information providing system, 10: server, 20: user terminal, 101: first acquisition unit, 102: extraction unit, 103: first calculation unit, 104: determination unit, 105: transmission unit, 106: third acquisition unit, 107: second calculation unit, 108: correction unit, 109: providing unit, 201 and 206: second acquisition unit, 202 and 209: generation unit, 203 and 207: transmission unit, 204 and 208: reception unit, 205 and 210: output unit

DETAILED DESCRIPTION OF THE EMBODIMENTS

1. A First Embodiment
1-1. Configuration

Figure 1:
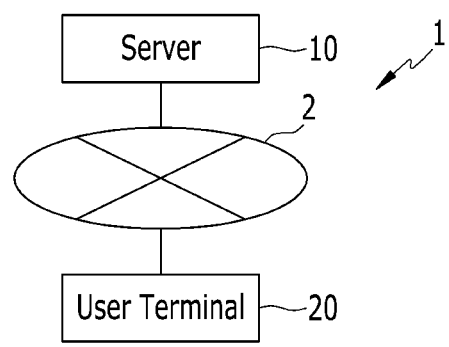
FIG. 1 is a diagram showing an example of a configuration of a cosmetics information providing system 1 according to a first embodiment.

FIG. 1 is a diagram showing an example of a configuration of a cosmetics information providing system 1 according to the first embodiment. The cosmetic information providing system 1 includes a server 10 and a user terminal 20. The server 10 and the user terminal 20 are connected through a network 2. The network 2 is, for example, the internet. However, the network 2 is not limited to the internet and may be another communication line.

The server 10 provides cosmetic information corresponding to a desired color of a user to the user terminal 20. The user terminal 20 is used by the user. For example, the user performs a color simulation of makeup using the user terminal 20. The user views cosmetic information provided from the server 10 using the user terminal 20.

Figure 2:
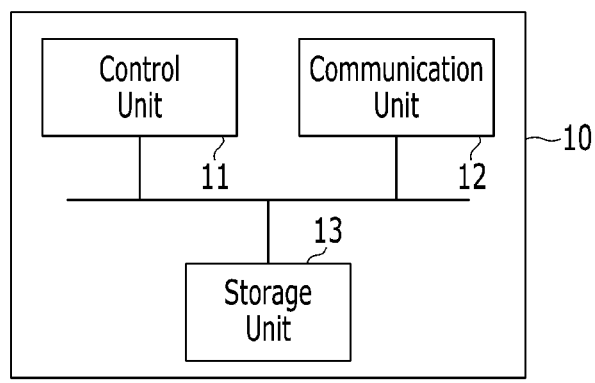
FIG. 2 is a diagram showing an example of a hardware configuration of a server 10.

FIG. 2 is a diagram showing an example of a hardware configuration of a server 10. The server 10 is a computer. The server 10 includes a control unit 11, a communication unit 12, and a storage unit 13.

The control unit 11 controls each unit of the server 10. For example, a processor such as a central processing unit (CPU) or the like, and a memory such as a read only memory (ROM), a random access memory (RAM), or the like are used as the control unit 11. One or multiple processors and one or multiple memories may be used. The communication unit 12 is a communication interface that is connected to the network 2. The communication unit 12 performs data communication with the user terminal 20 through the network 2 under a control of the control unit 11.

The storage unit 13 stores various data and programs. For example, a hard disk drive is used as the storage unit 13. The program stored in the storage unit 13 includes a server program. The server program describes server-side procedures in purchase support processing, correction processing, and feedback processing to be described later. Further, the storage unit 13 stores a product table 131, a color table 132, and a user table 133.

FIG. 3 is a diagram showing an example of a product table 131. The product table 131 stores information about cosmetics. The product table 131 stores names, image data and product information of cosmetics. The name of cosmetic is information for identifying the cosmetic. The image data are data indicating an image of the cosmetic. This image is a photograph of the appearance that is, for example, cosmetic package. The product information is detailed information of the cosmetic. For example, the product information includes a price or brand name of the cosmetic. In addition, the product information may include a release date or popularity of the cosmetic.

FIG. 4 is a diagram showing an example of a color table 132. The color table 132 stores information about colors of cosmetics. More specifically, the color table 132 stores names and color information of the cosmetics. The name of cosmetic is the same as the name of cosmetic stored in the product table 131. The color information is information indicating a color of makeup using the cosmetic. For example, Munsell value is used as the color information. Further, values represented by other display systems may be used as the color information. The color information may be a color of makeup using a single cosmetic, or may be a color of makeup using a combination of a plurality of cosmetics. For example, the color information C2 indicates a color of the makeup of painting an eye shadow B and an eye shadow C one above the other.

FIG. 5 is a diagram showing an example of a user table 133. The user table 133 stores information about users. More specifically, the user table 133 stores user IDs, types of skin colors, skill levels, types of makeup tools, and favorite brand names. The user ID is information for identifying the user. The type of skin color is a type of color of the user's skin. The skill level is a level of a makeup skill of the user. The type of cosmetic tool is a type of cosmetic tool owned by the user. The favorite brand name is a brand name of a cosmetic which the user likes. For example, these information may be registered in advance by the user.

Figure 6:
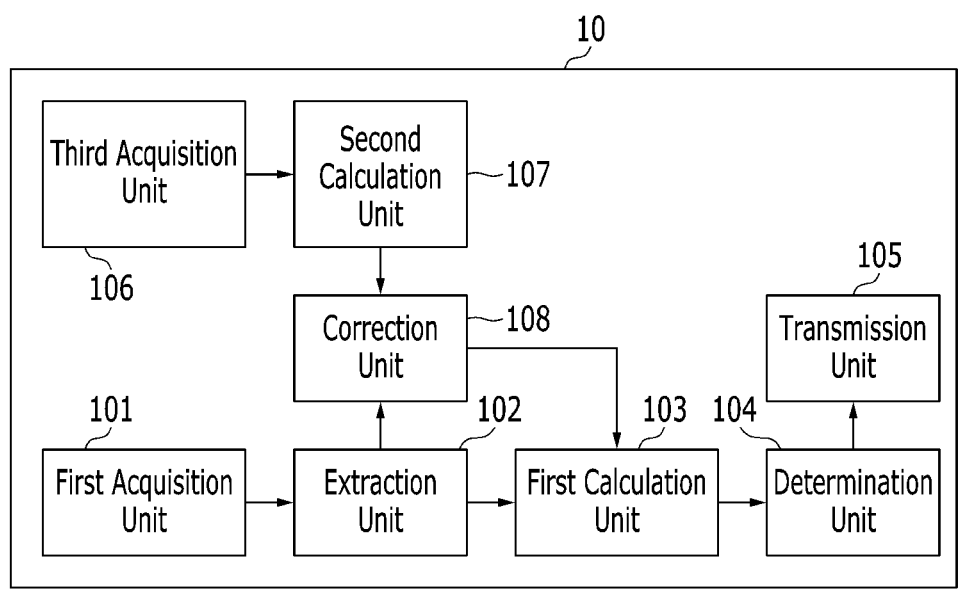
FIG. 6 is a diagram showing an example of a functional configuration of a server 10.

FIG. 6 is a diagram showing an example of a functional configuration of a server 10. The server 10 includes functions of a first acquisition unit 101, an extraction unit 102, a first calculation unit 103, a determination unit 104, a transmission unit 105, a third acquisition unit 106, a second calculation unit 107, and a correction unit 108. The first acquisition unit 101, the transmission unit 105, and the third acquisition unit 106 are realized by the communication unit 12 under a control of the control unit 11. The extraction unit 102, the first calculation unit 103, the determination unit 104, the second calculation unit 107, and the correction unit 108 are realized by the control unit 11. For example, the processor stores a server program in the memory and executes the server program, thereby realizing these functions.

The first acquisition unit 101 acquires from the user terminal 20 a first image representing a face on which makeup has been performed using the first color. The first image is generated by using, for example, a user's face image. The extraction unit 102 extracts a first color from the first image acquired by the first acquisition unit 101. The color includes not only a kind of color but also a color density or texture.

The first calculation unit 103 calculates a similarity between the first color extracted by the extraction unit 102 and a second color of makeup using a predetermined cosmetic. The predetermined cosmetic is, for example, a cosmetic whose information is stored in the product table 131. The cosmetic may be a single cosmetic or may be a combination of a plurality of cosmetics. The determination unit 104 determines a cosmetic where the similarity calculated by the first calculation unit 103 is higher than a threshold. For example, this threshold is set in advance.

The transmission unit 105 transmits information for identifying the cosmetic determined by the determining unit 104 to the user terminal 20. The information for identifying the cosmetic is, for example, a name of the cosmetic. However, the information for identifying the cosmetic is not limited to the name of the cosmetic, and may be any information as long as information capable of identifying the cosmetic. Further, as the information for identifying for the cosmetic, an image obtained by encoding the information for identifying the cosmetic, such as a barcode, a two-dimensional code, or the like, may be used.

The third acquisition unit 106, after the user terminal 20 outputs the information for identifying the cosmetic determined by the determination unit 104, acquires from the user terminal 20 a fifth image representing a face of the user on which makeup with a third color has been performed using this cosmetic. The second calculation unit 107 calculates a correction value in accordance with a difference between the first color and the third color. If the first acquisition unit 101 acquires a sixth image representing a face of the user on which makeup with a fourth color has been performed, the correction unit 108 corrects the fourth color using the correction value calculated by the second calculator 107.

Figure 7:
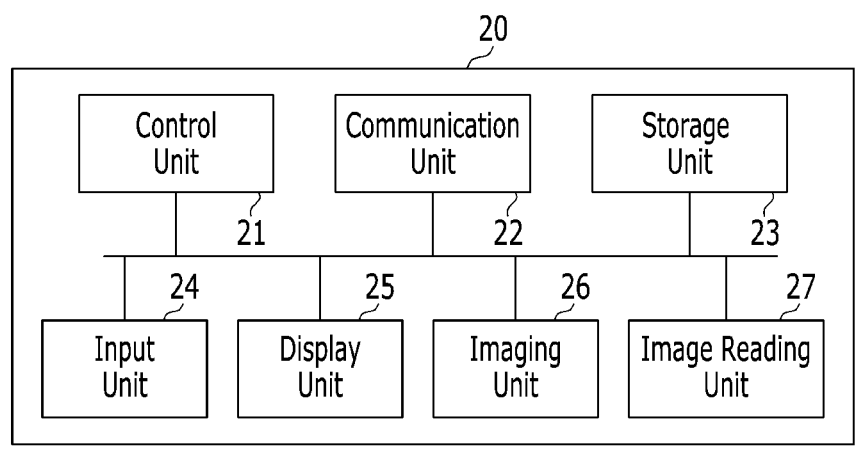
FIG. 7 is a diagram showing an example of a hardware configuration of a user terminal 20.

FIG. 7 is a diagram showing an example of a hardware configuration of a user terminal 20. The terminal 20 is a computer such as a tablet or a personal computer. The user terminal 20 includes a control unit 21, a communication unit 22, a storage unit 23, an input unit 24, a display unit 25, an imaging unit 26, and an image reading unit 27.

The control unit 21 controls each unit of the user terminal 20. As the control unit 21, for example, a processor such as a CPU or the like, and a memory such as a ROM, a RAM, or the like are used. One or multiple processors and one or multiple memories may be used. The communication unit 22 is a communication interface that is connected to the network 2. The communication unit 22 performs data communication with the server 10 through the network 2 under a control of the control unit 21.

The storage unit 23 stores various data and programs. As the storage unit 23, for example, a hard disk drive is used. The program stored in the storage unit 23 includes a client program. The client program describes user terminal-side procedures in purchase support processing, correction processing, and feedback processing to be described later. Further, the data stored in the storage unit 23 includes a makeup pattern of each portion of a face with makeup, such as an eye, a cheek, a mouth, and the like. The makeup pattern has at least a shape according to a corresponding portion.

The input unit 24 inputs information according to a user's operation. For example, a mouse and a keyboard are used as the input unit 24. Alternatively, a touch panel may be used as the input unit 24. The display unit 25 displays various kinds of information. For example, a liquid crystal display is used as the display unit 25.

The imaging unit 26 captures an image. For example, a camera is used as the imaging unit 26. The image reading unit 27 reads an image. For example, a scanner is used as the image reading unit 27.

Figure 8:
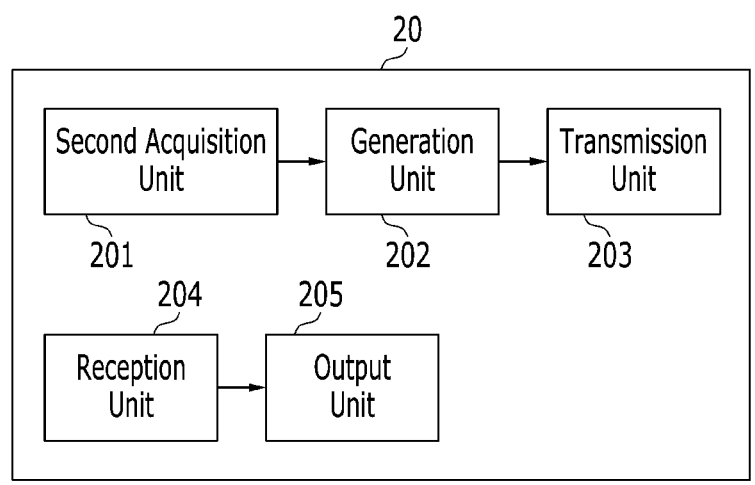
FIG. 8 is a diagram showing an example of a functional configuration of a user terminal 20.

FIG. 8 is a diagram showing an example of a functional configuration of a user terminal 20. The user terminal 20 includes functions of a second acquisition unit 201, a generation unit 202, a transmission unit 203, a reception unit 204, and an output unit 205. The transmission unit 203 and the reception unit 204 are realized by the communication unit 22 under a control of the control unit 21. The second acquisition unit 201, the generation unit 202, and the output unit 205 are realized by the control unit 21. For example, the processor stores a client program in the memory and executes the client program, thereby realizing these functions.

The second acquisition unit 201 acquires a second image representing a user's face from the imaging unit 26. The generation unit 202 generates a third image representing a face on which makeup has been performed using a color selected by the user, by using the second image acquired by the second acquisition unit 201. The transmission unit 203 transmits the image data of a third image generated by the generation unit 202 to the server 10. The reception unit 204 receives information for identifying a cosmetic from the server 10.

The output unit 205 outputs the information received by the reception unit 204. For example, the output unit 205 displays the information on the display unit 25. However, outputting the information is not limited to displaying the information. For example, when the user terminal 20 includes a printer, the information may be output by being printed by the printer. As another example, when the user terminal 20 includes a speaker, the information may be output from the speaker as sound.

1-2. Purchase Support Processing

Figure 9:
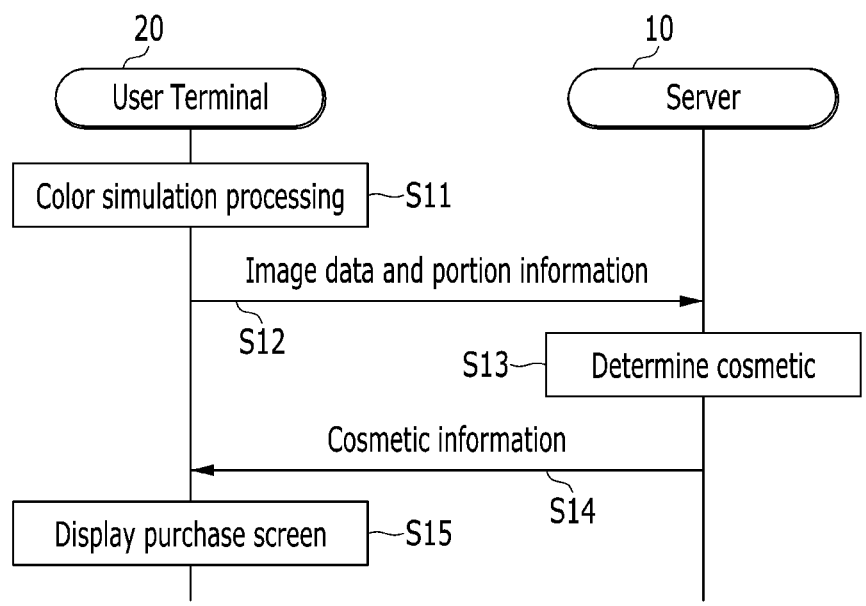
FIG. 9 is a sequence diagram showing an example of purchase support processing according to a first embodiment.
Figure 10:
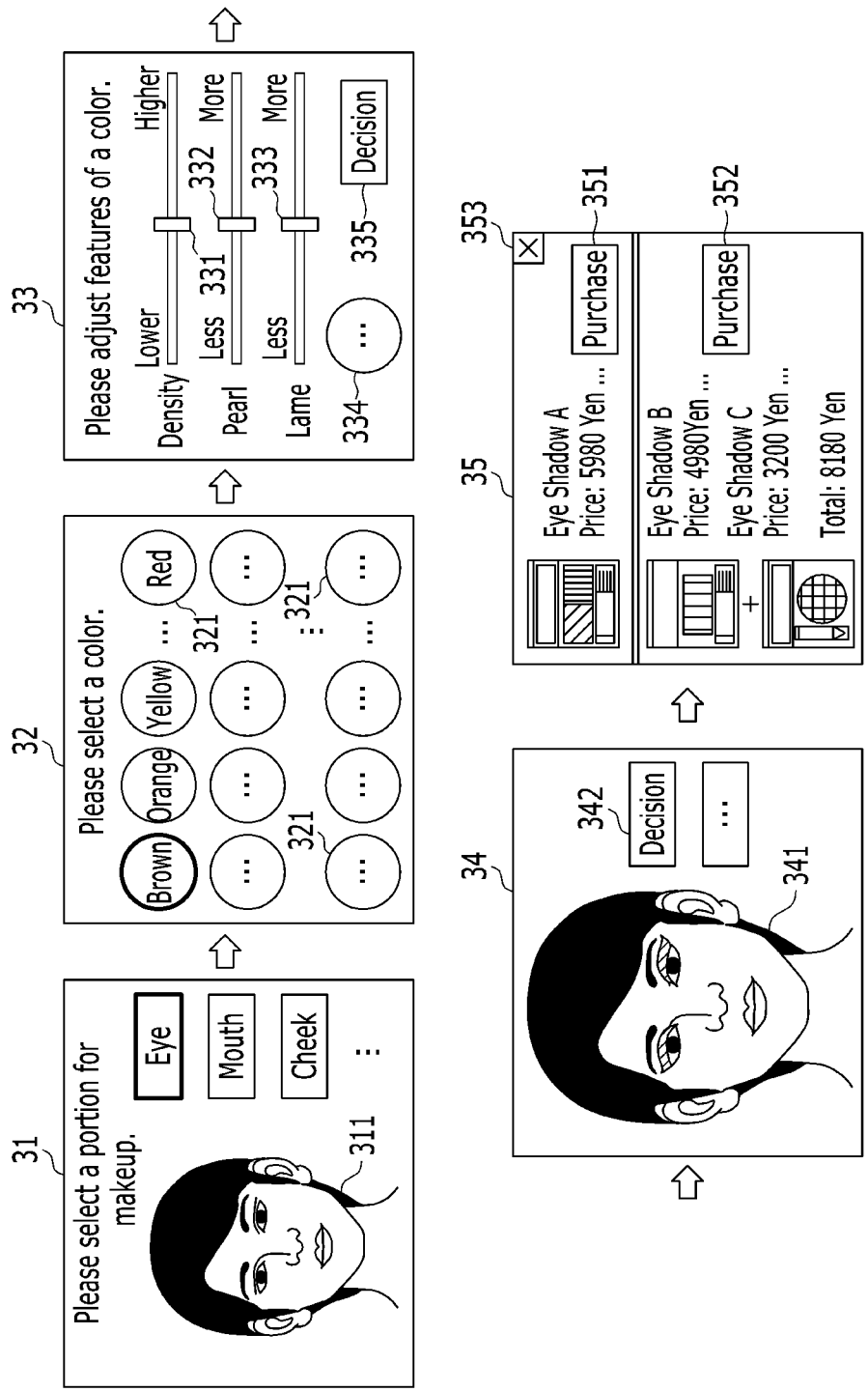
FIG. 10 is a drawing showing an example of screen transition of a user terminal 20 in purchase support processing according to a first embodiment.

FIG. 9 is a sequence diagram showing an example of purchase support processing according to the first embodiment. FIG. 10 is a drawing showing an example of screen transition of a user terminal 20 in the purchase support processing. In the purchase support processing, a color simulation of makeup using a face image of a user is performed. When the user selects a desired color referring to a result of the color simulation, a cosmetic corresponding to the color is recommended.

In a step S11, color simulation processing is executed. In detail, the user first photographs his or her face image 311 using the imaging unit 26. The face image 311 is an example of the "second image" according to the present invention. The second acquisition unit 201 acquires the face image 311 photographed by the imaging unit 26.

When the face image 311 is photographed, a screen 31 shown in FIG. 10 is displayed on the display unit 25. The screen 31 includes the face image 311. The screen 31 receives an operation of selecting a portion (hereinafter referred to as a "first target portion") for performing makeup. For example, when the user performs an operation of selecting an eye using the input unit 24, the eye is selected as the first target portion. Here, the "eye" is not an eyeball portion between eyelids but refers to an eyehole.

When the first target portion is selected, a screen 32 shown in FIG. 10 is displayed on the display unit 25. The screen 32 includes samples 321 of a plurality of colors. The colors of the samples 321 may be colors of existing cosmetics or may be colors unrelated to the existing cosmetics. The screen 32 receives an operation of selecting a color of makeup from among the colors of the samples 321. For example, when the user performs an operation of selecting a brown using the input unit 24, the brown is selected as the color of the makeup.

When the color of the makeup is selected, a screen 33 shown in FIG. 10 is displayed on the display unit 25. The screen 33 receives an operation of adjusting features of the selected color. The features include a color density or texture. However, the features of color are not limited to the color density or texture, but may be other features included in the color. The screen 33 includes sliders 331 to 333. The sliders 331 to 333 are used in operations for adjusting the density of the color, an amount of pearl, and an amount of lame. The amount of pearl and the amount of lame affect the texture of the color. The user operates the sliders 331 to 333 using the input unit 24 thereby adjusting the features of the color. Further, the screen 33 includes a sample 334 of the adjusted color. Each time the features of the color of are adjusted by the user's operation, the sample 334 indicates the color after adjustment. Furthermore, the screen 33 includes a decision button 335. When adjusting the features of the color is completed, the user presses the decision button 335 using the input unit 24. In the following description, the color after adjustment is referred to as a "first target color." The first target color is an example of the "first color" according to the present invention.

When a decision button 335 is pressed, the generation unit 202 uses the face image 311 described above to generate a user's face image 341 where makeup with the first target color has been performed on the first target portion. The face image 341 is an example of the "first image" and the "third image" according to the present invention. In detail, the generation unit 202 identifies the first target portion from the face image 311 by image recognition. The generation unit 202 layers a makeup pattern of the first target color on the identified first target portion. This makeup pattern is a makeup pattern for the eye, with a shape corresponding to the eyehole. The makeup pattern is read from the storage unit 23 and is then used. In this manner, the user's face image 341 is generated.

When the user's face image 341 is generated, a screen 34 shown in FIG. 10 is displayed on the display unit 25. The screen 34 includes the face image 341. Further, the screen 34 includes a decision button 342. When the user likes the first target color, the user presses the decision button 342 using the input unit 24. When the decision button 342 is pressed, the process proceeds to a step S12.

Referring to FIG. 9 again, at a step S12, the transmission unit 203 transmits to the server 10 image data representing the user's face image 341 and portion information indicating the first target portion together with a user ID of the user who uses the user terminal 20. For example, information, which is input by an operation using the input unit 24 when the user logs in the user terminal 20, is used as the user ID. The user ID, the image data, and the portion information that are transmitted from the user terminal 20 reach the server 10 via the network 2. The first acquisition unit 101 receives the user ID, the image data, and the portion information.

In a step S13, a cosmetic corresponding to a color of the makeup performed on the first target portion, i.e., the first target color is determined by analyzing the face image 341 represented by the received image data.

In detail, the extraction unit 102 first identifies a region of the first target portion from the face image 341 by the image recognition. This identification is performed, for example, by using a well-known face recognition technology using a positional relationship of feature points such as the eyes, nose, mouth, and the like. For example, when the first target portion is the eye, a region of the eyehole is identified. Subsequently, the extraction unit 102 extracts the first target color from the identified region.

The first calculation unit 103 reads color information of a cosmetic corresponding to the first target portion from the color table 132. The cosmetic corresponding to the first target portion refers to a cosmetic used in the makeup for the first target portion. For example, when the first target portion is the eye, the cosmetic corresponding to the first target portion is the eye shadow. In this case, for example, color information C1 to C3 stored in association with eye shadows A to D is read from the color table 132 shown in FIG. 4.

Subsequently, the first calculation unit 103 calculates a similarity between the first target color extracted by the extraction unit 102 and a color indicated by the color information read from the color table 132. The color indicated by the color information is an example of the "second color" according to the present invention. For example, the similarities between the first target color and the colors indicated by the color information C1 to C3 are calculated.

Figures 11, 12:
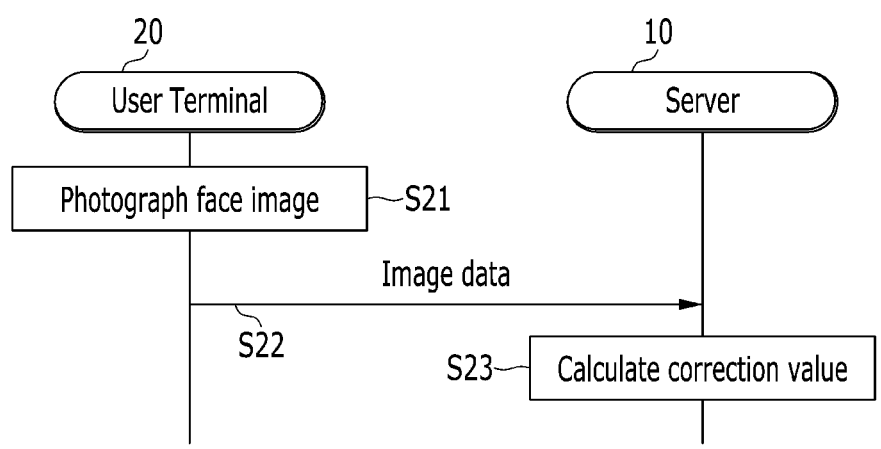
FIG. 11 is a diagram showing an example of a similarity.
FIG. 12 is a sequence diagram showing correction processing.

FIG. 11 is a diagram showing an example of the calculated similarity. In this example, the similarity between the first target color and the color indicated by the color information C1 is "98." The similarity between the first target color and the color indicated by the color information C2 is "92." The similarity between the first target color and the color indicated by the color information C3 is "89."

The determination unit 104 determines a cosmetic where the similarity calculated by the first calculation unit 103 is higher than the threshold. The cosmetic determined by the determination unit 104 may be a single cosmetic or may be a combination of a plurality of cosmetics. Here, it is assumed that the threshold is "90." In this case, the similarity "98" between the first target color and the color indicated by the color information C1 and the similarity "92" between the first target color and the color indicated by the color information C2 are higher than the threshold. Therefore, the eye shadow A, and a combination of the eye shadows B and C are determined.

Referring to FIG. 9 again, in a step S14, the transmission unit 105 transmits cosmetic information about the cosmetic determined in the step S13 to the user terminal 20. The cosmetic information includes a name, image data, and product information of the cosmetic stored in the product table 131. In this example, the name, image data and product information of the eye shadow A, the name, image data and product information of the eye shadow B, and the name, image data and product information of the eye shadow C are read from the product table 131 and are then transmitted. The cosmetic information transmitted from the server 10 reaches the user terminal 20 via the network 2. The reception unit 204 receives this cosmetic information.

In a step S15, the output unit 205 displays a purchase screen 35 on the display unit 25 based on the received cosmetic information. In this example, as shown in FIG. 10, the purchase screen 35 includes the name, image and product information of the eye shadow A, the name, image and product information of the eye shadow B, and the name, image and product information of the eye shadow C.

Moreover, the purchase screen 35 includes purchase buttons 351 and 352. The purchase button 351 is used for an operation of performing the purchase of the eye shadow A. The purchase button 351 is used for an operation of performing the purchase of eye shadows B and C. For example, when purchasing the eye shadow A, the user presses the purchase button 351 using the input unit 24. When the purchase button 351 is pressed, a procedure for purchasing the eye shadow A is performed by e-commerce. As a result, the purchase of the eye shadow A is completed.

1-3. Correction Processing

FIG. 12 is a sequence diagram showing correction processing. The correction processing is executed after the user actually purchases a cosmetic by the above-described purchase support processing. In the above-described purchase support processing, the user purchases the cosmetic having a color close to the color on which the color simulation is performed. However, there is a case that the difference between the color for the color simulation and the color of when the actually purchased cosmetic is used occurs. The correction processing is executed to reduce this difference in the next purchase support processing.

Here, the storage unit 13 stores the user ID, the image data, and portion information that are received from the user terminal 20 in the step S12 described above. In the following description, the image data are referred to as "reference image data".

In a step S21 shown in FIG. 12, the user, after performing makeup using the purchased cosmetic, photographs his or her face image using the imaging unit 26. For example, if the eye shadow A is purchased by the above-described purchase support processing, the user's face image after the makeup using the eye shadow A is performed is photographed. This face image is an example of the "fifth image" of the present invention.

In a step S22, the transmitting unit 203, together with the user ID of the user who uses the user terminal 20, transmits the image data representing the face image photographed at the step S21 to the server 10. For example, information, which is input by an operation using the input unit 24 when the user logs in the user terminal 20, is used as the user ID. In the following description, this image data are referred to as "target image data." The user ID and the image data that are transmitted from the user terminal 20 reach the server 10 via the network 2. The third acquisition unit 106 receives the user ID and the target image data.

In a step S23, a correction value is calculated by using the received target image data and the reference image data stored in the storage unit 13. In detail, the extraction unit 102, as in step S103 of the above-described purchase support processing, extracts a color (hereinafter referred to as an "ideal color") of makeup performed on the first target portion from the face image 341 represented by the reference image data. The ideal color is an example of the "first color" according to the present invention. Further, the extraction unit 102 extracts a color (hereinafter referred to as an "actual color") of makeup performed on the first target portion from the face image represented by the target image data. The actual color is an example of the "third color" according to the present invention. The second calculation unit 107 compares the ideal color and the actual color extracted by the extraction unit 102 to obtain a difference between these colors. The second calculation unit 107 calculates the correction value based on the difference of the colors. For example, if the actual color is darker than the ideal color, the correction value for lowering the density of the color is calculated. The calculated correction value is stored in the storage unit 13.

Thereafter, the process proceeds to the step S13 in the purchase support processing, and then the correction unit 108 corrects the first target color extracted by the extraction unit 102 using the correction value stored in the storage unit 13. The first target color is a color of makeup included in a user's face image that is newly acquired by the first acquisition unit 101. This face image is an example of the "sixth image" according to the present invention. The color of makeup included in the face image is an example of the "fourth color" according to the present invention. For example, when the correction value is a value for lowering the density of color, the density of the first target color is lowered by using the correction value. The first calculation unit 103 calculates the similarity by using the first target color after the correction. Thus, a cosmetic corresponding to the first target color after the correction is determined, and information about the determined cosmetic is provided.

1-4. Feedback Processing

The first target color selected by the user in the above-described purchase support processing is a color of a cosmetic desired by the user. The first target color information is considered to be valuable information for organizations such as manufacturers performing cosmetic manufacturing or development. Particularly, when the first target color is a color that is not found in the existing cosmetics or when the first target color is selected by many users, information about the first target color is helpful in development of new cosmetics. Therefore, color information indicating the first target color may be provided to the organizations such as manufacturers performing cosmetic manufacturing or development.

Here, it is assumed that the organization has an external device connected to the network 2. In this case, the transmission unit 203 transmits the color information indicating the first target color to the external device. As another example, as shown in FIG. 10, the purchase screen 35 includes a close button 563. When the purchase screen 35 does not include information about a cosmetic which the user wants to purchase, the user presses the close button 563 using the input unit 24. The purchase screen 35 is then closed. As such, if the purchase of the cosmetic is not performed from the purchase screen 35, the first target color is likely to be a color that is not found in the existing cosmetics. Therefore, the transmission unit 203 may transmit color information indicating the first target color to the external device only when the close button 563 is pressed. As yet another example, the transmission unit 105 of the server 10 may transmit the color information indicating the first target color to the external device.

According to the first embodiment, the cosmetic information corresponding to the desired color of the user is provided. The user can purchase the cosmetic corresponding to the desired color by viewing this information. The desired color is not limited to a color of makeup using the existing cosmetics and may be other colors.

2. The Second Embodiment 2-1. Configuration

In a second embodiment, purchase support processing different from that in the first embodiment is executed. A configuration of a cosmetic information providing system 1, a hardware configuration of a server 10, and a hardware configuration of a user terminal 20 according to the second embodiment are the same as those according to the first embodiment. A functional configuration of the server 10 is basically the same as that according to the first embodiment. However, the first acquisition unit 101 acquires a first image representing a face of a person different from the user. Meanwhile, a functional configuration of the user terminal 20 is different from that according to the first embodiment.

Figure 13:
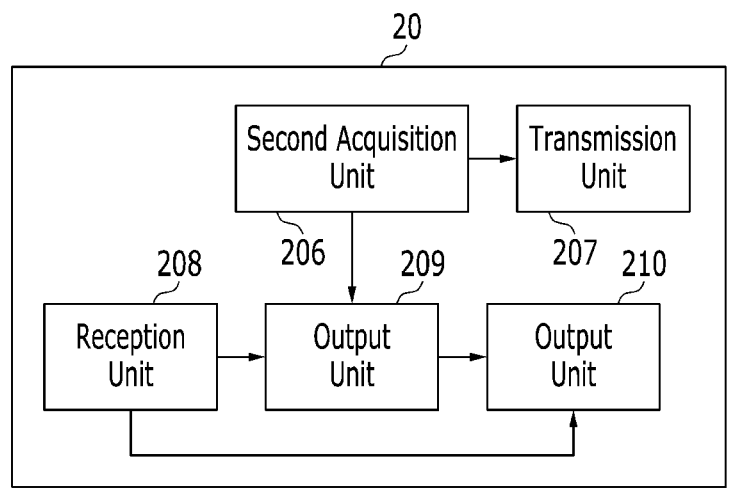
FIG. 13 is a diagram showing an example of a functional configuration of a user terminal 20 according to a second embodiment.

FIG. 13 is a diagram showing an example of a functional configuration of a user terminal 20 according to the second embodiment. The user terminal 20 includes functions of a second acquisition unit 206, a transmission unit 207, a reception unit 208, a generation unit 209, and an output unit 210. The transmission unit 207 and the reception unit 208 are realized by the communication unit 22 under a control of the control unit 21. The second acquisition unit 206, the generation unit 209, and the output unit 210 are realized by the control unit 21. For example, the processor stores a client program in the memory and executes the client program, thereby realizing these functions.

The second acquisition unit 206 acquires a first image representing a face of a person different from the user from the image reading unit 27 or the imaging unit 26. The transmission unit 207 transmits image data of the first image acquired by the second acquisition unit 206 to the server 10. The reception unit 208 receives information for identifying a cosmetic from the server 10. The output unit 210 outputs the information received by the reception unit 208. For example, the output unit 210 displays the information on the display unit 25. However, as described in the first embodiment, outputting the information is not limited to displaying the information.

Further, the second acquisition unit 206 acquires a second image representing a face of the user from the imaging unit 26. The generation unit 209 generates a fourth image representing a face on which makeup has been performed using a cosmetic identified by the information received by the reception unit 208, by using the second image acquired by the second acquisition unit 206. The output unit 210 outputs the fourth image generated by the generation unit 209.

2-2. Purchase Support Processing

Figure 14:
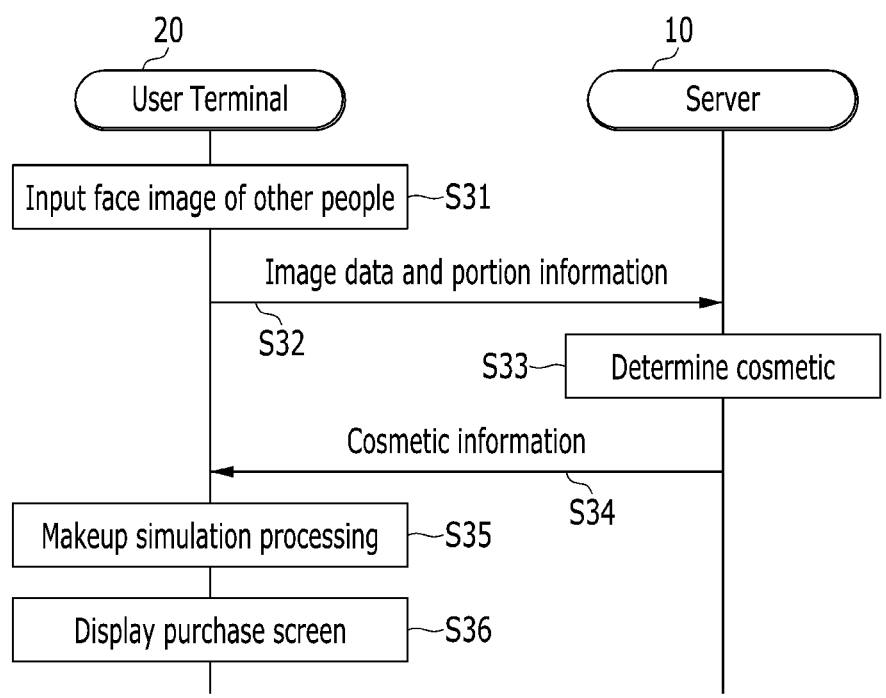
FIG. 14 is a sequence diagram showing purchase support processing according to a second embodiment.
Figure 15:
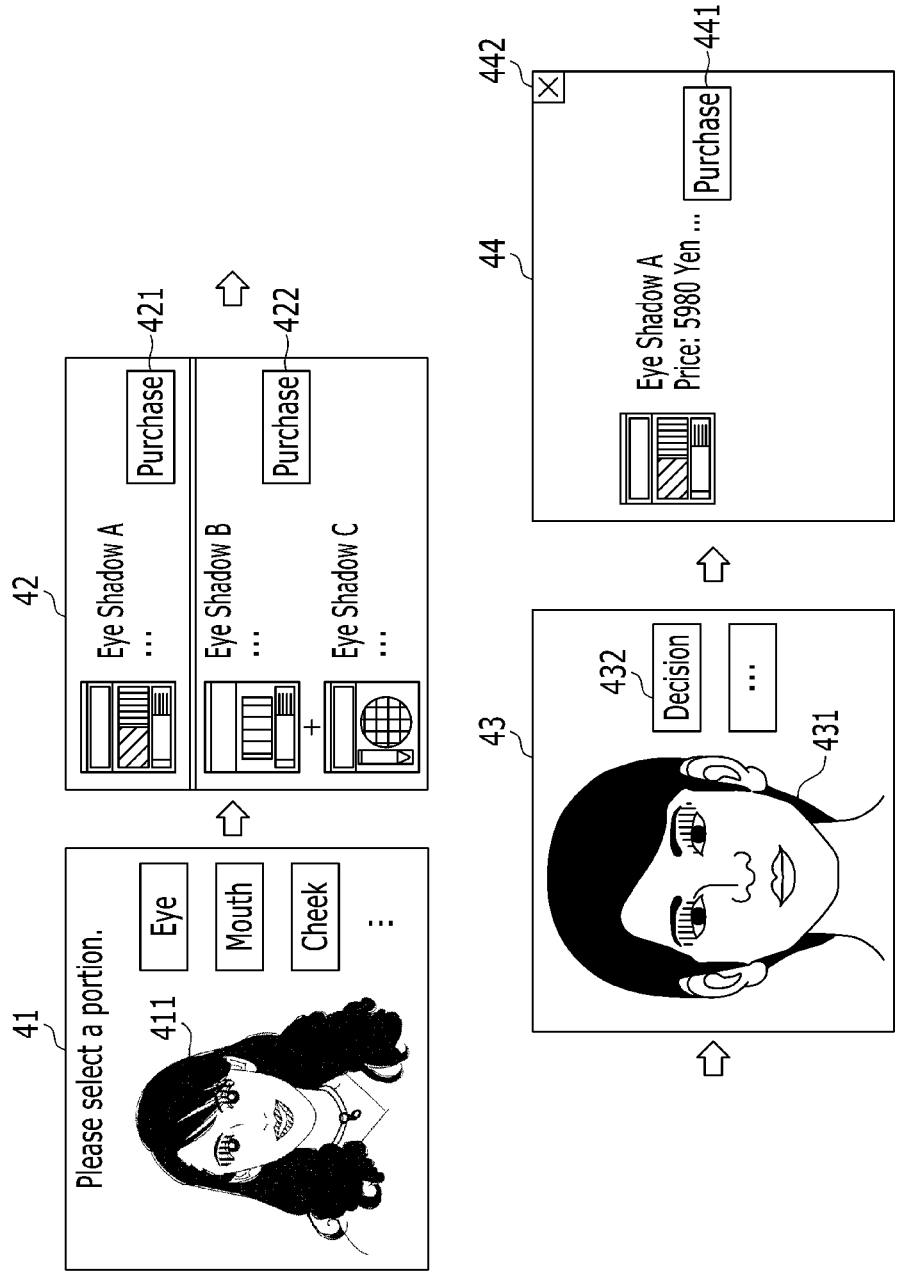
FIG. 15 is a drawing showing an example of screen transition of a user terminal 20 in purchase support processing according to a second embodiment.

FIG. 14 is a sequence diagram showing purchase support processing according to the second embodiment. FIG. 15 is a drawing showing an example of screen transition of a user terminal 20 in the purchase support processing. In the purchase support processing, the user inputs a face image of other people on which a desired makeup has been performed to the user terminal 20. As a result, a cosmetic corresponding to a color of this makeup is recommended. Furthermore, a simulation of makeup with the recommended cosmetic is performed by using the user's face image.

In a step S31, the user inputs a face image 411 of the other people on which makeup has been performed to the user terminal 20. The face image 411 is a face image of a person different from the user. For example, it is assumed that the user likes makeup of a model published in a magazine. In this case, the user reads a page in which this model is published by the image reading unit 27. Thus, the face image 411 of the model is input to the user terminal 20.

As another example, it is assumed that the user likes makeup of a friend. In this case, the user photographs a face image 411 of the friend using the imaging unit 26. Accordingly, the face image 411 of the friend is input to the user terminal 20. In the following description, the face image 411 which is input in the step S31 is referred to as a "model image" 411. The model image 411 is an example of the "first image" according to the present invention.

If the model image 411 is input, the screen 41 shown in FIG. 15 is displayed on the display unit 25. The screen 41 includes the model image 411. The screen 41 receives an operation of selecting a portion on which makeup is performed. Here, it is assumed that the user likes the makeup of the eye in the model image 411. In this case, the user performs an operation of selecting the eye using the input unit 24. Thus, the eye is selected. In the following description, a portion that has been selected by the user's operation is referred to as a "second target portion." When the second target portion is selected, the process proceeds to a step S32.

Referring to FIG. 14 again, in a step S32, the transmission unit 207 transmits to the server 10 image data representing the model image 411 inputted in the step S31 and portion information indicating the second target portion together with a user ID of the user who uses the user terminal 20. For example, information, which is input by an operation using the input unit 24 when the user logs in the user terminal 20, is used as the user ID, similarly to the first embodiment described above. The user ID, the image data, and the portion information that are transmitted from the user terminal 20 reach the server 10 via the network 2. The first acquisition unit 101 receives the user ID, the image data, and the portion information.

In a step S33, a cosmetic corresponding to a color of the makeup performed on the second target portion is determined by analyzing the model image 411 represented by the received image data.

In detail, similarly to the first embodiment described above, the extraction unit 102 first identifies a region of the second target portion from the model image 411 by the image recognition and extracts the color of the makeup from the identified region. In the following description, the extracted color of the makeup is referred to as a "second target color." The second target color is an example of the "first color" according to the present invention.

Similarly to the first embodiment described above, the first calculation unit 103 reads color information of a cosmetic corresponding to the second target portion from the color table 132, and calculates a similarity between the second target color extracted by the extraction unit 102 and a color indicated by the color information that is read. The color indicated by this color information is an example of a "second color" according to the present invention. As in the first embodiment described above, the determination unit 104 determines a cosmetic where the calculated similarity is higher than a threshold. Here, it is assumed that an eye shadow A, and a combination of eye shadows B and C are determined.

In a step S34, the transmission unit 105 transmits cosmetic information about the cosmetic determined in the step S33 to the user terminal 20 as in the first embodiment described above. The cosmetic information transmitted from the server 10 reaches the user terminal 20 via the network 2. The reception unit 204 receives this cosmetic information.

In a step S35, makeup simulation processing is executed. Specifically, a screen 42 shown in FIG. 15 is first displayed on the display unit 25. The screen 42 is displayed based on the received cosmetic information. In this example, the screen 42 includes a name, an image and product information of the eye shadow A, a name, an image and product information of the eye shadow B, and a name, an image and product information of the eye shadow C.

The screen 42 receives an operation of selecting a cosmetic. The screen 42 includes selection buttons 421 and 422. The selection button 421 is used for an operation of selecting the eye shadow A. The selection button 422 is used for an operation of selecting the combination of eye shadows B and C. Here, it is assumed that the user wants to simulate makeup of the eye shadow A. In this case, the user presses the select button 421 using the input unit 24. As a result, the eye shadow A is selected. In the following description, the selected cosmetic is referred to as a "target cosmetic."

Subsequently, the user photographs his or her face image using the imaging unit 26. This face image is an example of a "second image" according to the present invention. The second acquisition unit 206 acquires the face image photographed by the imaging unit 26. As another example, image data representing the user's face image may be stored in advance in the storage unit 23. In this case, the image data are read from the storage unit 23 and are then used.

As in the first embodiment described above, the generation unit 202 generates a user's face image 431 where makeup using the target cosmetic has been performed on the second target portion by using the acquired face image. The face image 431 is an example of a "fourth image" according to the present invention.

When the user's face image 431 is generated, a screen 43 shown in FIG. 15 is displayed on the display unit 25. The screen 43 includes the face image 431. In addition, the screen 43 includes a proceeding button 432. If the user likes this makeup, the user presses the proceeding button 432 using the input unit 24. When the proceeding button 432 is pressed, this process proceeds to a step S36.

Referring to FIG. 14 again, at a step S36, the output unit 210 displays a purchase screen 44 on the display unit 25. The purchase screen 44 includes information about the target cosmetic among the received cosmetic information. In this example, as shown in FIG. 15, the purchase screen 44 includes the name, image and product information of the eye shadow A.

Furthermore, the purchase screen 44 includes a purchase button 441. The purchase button 441 is used for an operation of executing the purchase of the eye shadow A. For example, when purchasing the eye shadow A, the user presses the purchase button 441 using the input unit 24. When the purchase button 441 is pressed, a procedure of purchasing the eye shadow A is performed by e-commerce. As a result, the purchase of the eye shadow A is completed.

In the second embodiment, the correction processing and the feedback processing described in the first embodiment may be performed.

According to the second embodiment, the cosmetic information corresponding to the desired color of the user is provided. The desired color is extracted from the face image of the person different from the user. The user can purchase the cosmetic corresponding to the desired color by viewing this information.

3. Modified Examples

The present invention is not limited to the embodiments described above. Embodiments may be modified as follows, and may also be implemented by combining the following modified examples.

3-1. Modified Example 1

In the color simulation processing described above, a method for the user to select a color of makeup is not limited to the method described in the first embodiment.

For example, when the user selects a color of makeup, a proper color of the user may be recommended. In this case, the user terminal 20 includes functions of extraction unit and a determination unit in addition to the functions shown in FIG. 8. The extraction unit and the determination unit are realized by the control unit 21. For example, the processor stores the client program in the memory and executes the client program, thereby realizing the extraction unit and the determination unit. Further, a screen 36 is displayed on the display unit 25 instead of the screen 32.

Figure 16:
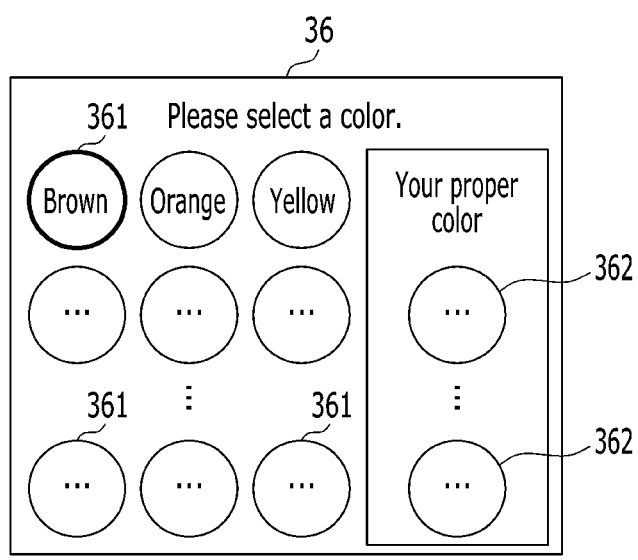
FIG. 16 is a diagram showing an example of a screen 36 according to a modified example.

FIG. 16 is a diagram showing an example of a screen 36. The screen 36 includes a sample 362 of the proper color of the user in addition to samples 361 of a plurality of colors. The proper color of the user is determined, for example, by the following method. First, the extraction unit extracts a color of a skin from the user's face image 311 acquired by the second acquisition unit 201 by the image recognition. The determination unit determines a type of the proper color of the user based on the color extracted by the extraction unit. For example, in the case where the color of the user's skin is the yellowish color, the yellow-based color is determined as the type of the proper color of the user. In this case, as a color to become a user, the yellow-based color is determined. The screen 36 receives an operation of selecting a color of makeup from among a plurality of colors including the proper color of the user. According to this modified example, the user can easily select the proper color of the user.

As another example, a new color is generated from a plurality of colors by the user. The generated color may be selected as the color of the makeup. In this case, a screen 37 is displayed on the display unit 25 instead of the screen 32.

Figure 17:
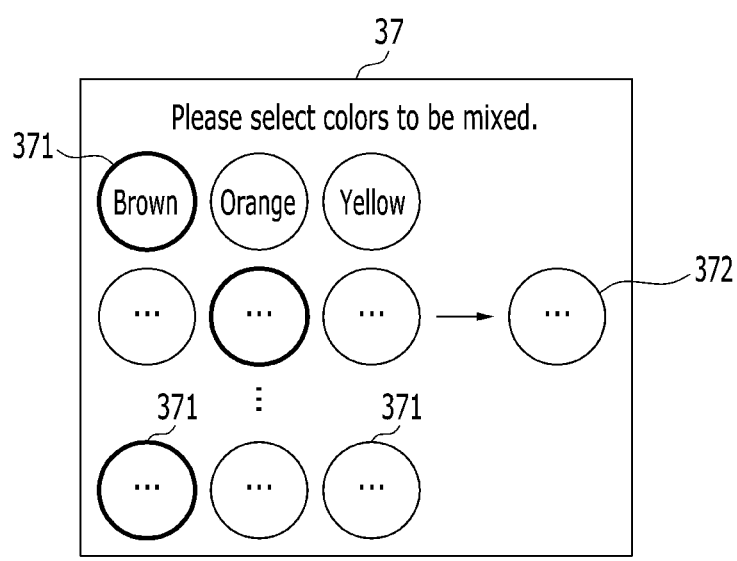
FIG. 17 is a diagram showing an example of a screen 37 according to a modified example.

FIG. 17 is a drawing showing an example of a screen 37. The screen 37 includes samples 371 of a plurality of colors. The screen 37 receives an operation of selecting multiple colors. When the user performs an operation of selecting the multiple colors using the input unit 24, a new color is generated by mixing these multiple colors. The screen 37 includes a sample 372 of the generated new color. The screen 37 receives an operation of selecting the generated new color. According to this modified example, when there is no desired color of the user in the plurality of color samples 371, the desired color can be generated by using the plurality of colors.

As another example, the color may be selected from the image input to the user terminal 20. This image is inputted to the user terminal 20, for example, by using the image reading section 27. This image need not be a face image of a person. This image may be any image having the color.

Here, it is assumed that the user likes a color of a flower. In this case, the user photographs an image 381 of the flower using the imaging unit 26. Then, the image 381 of the flower is inputted to the user terminal 20. A screen 38 is displayed on the display unit 25 instead of the screen 32.

Figure 18:
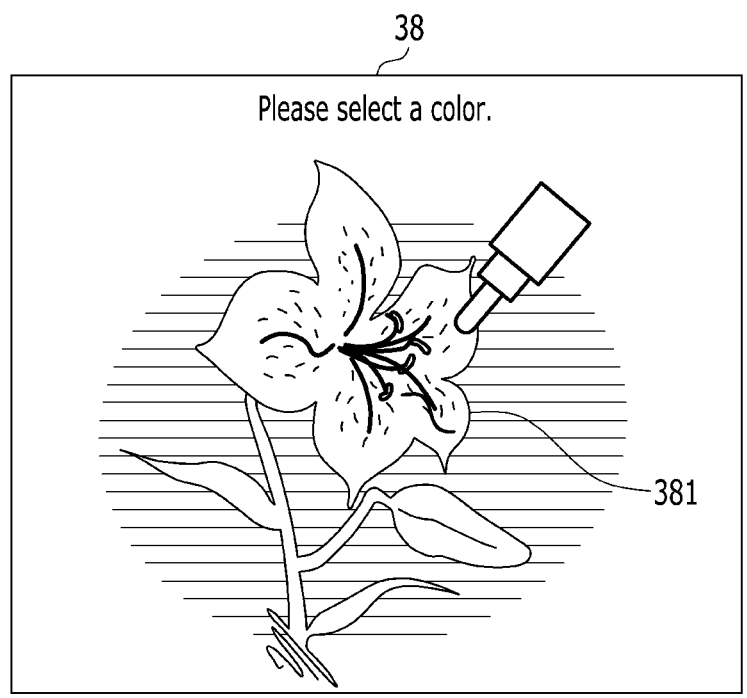
FIG. 18 is a diagram showing an example of a screen 38 according to a modified example.

FIG. 18 is a drawing showing an example of a screen 38. The screen 38 includes a flower photo 381. The screen 38 receives an operation of selecting a color from among colors included in the flower photo 381. For example, when the user performs an operation of selecting a certain portion of the flower using the input unit 24, a color of the certain portion is selected. According to this modified example, when the user finds a favorite color, it is possible to select this color as the color of the makeup.

3-2. Modified Example 2

A method of determining the cosmetic corresponding to the desired color of the user is not limited to the method described in the first embodiment or the second embodiment described above.

For example, a cosmetic may be determined by adding a color of the user's skin. The extraction unit 102 according to this modified example extracts the color of the skin from the image acquired by the first acquisition unit 101. The first calculation unit 103 calculates a similarity between a color obtained by superimposing a color of makeup on the color extracted by the extraction unit 102 and a color of makeup using a predetermined cosmetic. Thus, it is possible determines a cosmetic that can achieve makeup with a color close to the desired color when the user actually uses the cosmetic.

As another example, a cosmetic may be determined in consideration of additional information.

Figures 19, 20:
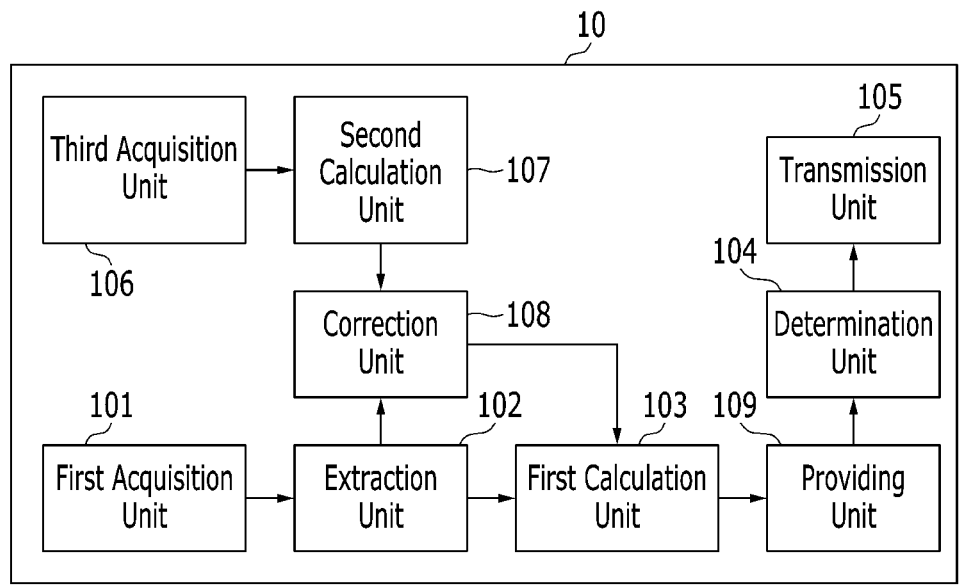
FIG. 19 is a diagram showing an example of a functional configuration of a server 10 according to a modified example.
FIG. 20 is a diagram showing an example of a priority according to a modified example.

FIG. 19 is a diagram showing an example of a functional configuration of a server 10 according to this modified example. The server 10 includes a function of a providing unit 109 in addition to the functions shown in FIG. 6.

The providing unit 109 gives priority to a cosmetic where the similarity calculated by the first calculation unit 103 is higher than a threshold, based on additional information about the cosmetic or the user. This additional information includes, for example, a price of the cosmetic, a popularity of the cosmetic, a release date of the cosmetic, a type of a color of the user's skin, a favorite cosmetic brand name, a level of a makeup skill, or a type of a makeup tool owned by the user.

The price of the cosmetic, the popularity of the cosmetic, and the release date of the cosmetic are included in, for example, product information that is stored in the product table 131. For example, if the user ID given to the user is "001," the information is extracted from the product information that is stored in association with the user ID "001" in the product table 131.

The type of the color of the user's skin, the favorite cosmetic brand name, the level of the makeup skill, and the type of the makeup tool owned by the user are stored in, for example, the user table 133. For example, if the user ID given to the user is "001," the information is stored in association with the user ID "001" is read from the user table 133.

For example, if the additional information includes the price of the cosmetic, the lower the price of cosmetic is, the higher the priority is. Alternatively, the higher the price of cosmetic is, the higher the priority may be. If the additional information includes the popularity of the cosmetic, the higher the popularity is, the higher the priority is. If the additional information includes the release date of the cosmetic, the newer the release date is, the higher the priority is.

If the additional information includes the type of the color of the user's skin, the priority of the cosmetic having the color fitting this type is higher than the priorities of other cosmetics. For example, if the type of color of the user's skin is yellow-based color, a priority of a cosmetic having the yellow-based color is higher than priorities of other cosmetics.

If the additional information includes the brand name of the user's favorite cosmetic, the priority of this brand cosmetic is higher than the priorities of the other brand cosmetics. For example, if the user likes a certain cosmetic brand, a priority of this brand cosmetic increases.

If the additional information includes the makeup skill level of the user, the priority of the cosmetic that fits the makeup skill level is higher than the priorities of other cosmetics. For example, if the makeup skill level of the user is low, a priority of a cosmetic that can be easily used is higher than priorities of other cosmetics.

If the additional information includes the type of the makeup tool owned by the user, a priority of a cosmetic using this makeup tool is higher than priorities of cosmetics using other makeup tools. For example, if the user has a brush, a priority of a cosmetic using the brush is higher than priorities of other cosmetics.

The determining unit 104 according to this modified example determines a predetermined number of cosmetics in the order of highest priority based on the priorities given by the providing unit 109.

FIG. 20 is an example of a given priority. In the following description, the first target color used in the first embodiment described above and the second target colors used in the second embodiment described above are collectively referred to as a "target color." In this example, similarly to FIG. 11 described above, a similarity between the target color and a color indicated by color information C1 is "98." A similarity between the target color and a color indicated by color information C2 is "92." A similarity between the target color and a color indicated by color information C3 is "89." Here, it is however assumed that a threshold is 80. In this case, all of these similarities are higher than the threshold.

In this case, priorities are given to an eye shadow A, a combination of eye shadows B and C, and an eye shadow D. In this example, the eye shadow A is assigned the priority "1," the combination of eye shadows B and C are assigned the priority "3," and the eye shadow D is assigned the priority "2." Here, it is assumed that the predetermined number is two. In this case, the eye shadow A with the priority "1" and the eye shadow D with the priority "2" are determined. According to this modified example, it is possible to determine cosmetics that are more appealing to the user.

As another example, the second calculator 107 may calculate the correction value in accordance with the characteristics of the display unit 25. Similarly to the above-described correction processing, the correction unit 108 corrects the target color using the correction value calculated by the second calculator 107. This can reduce the color difference due to the difference in the characteristics of the display unit 25.

3-3. Modified Example 3

In the first embodiment and the second embodiment described above, descriptive information of a makeup method using the cosmetic determined by the determination unit 104 may be provided. The storage unit 13 according to this modified example stores a product table 134 instead of the product table 131, FIG. 21 is a diagram showing an example of a product table 134. The product table 134 includes descriptive information of makeup methods in addition to names, color information, image data and product information of cosmetics stored in the product table 131 shown in FIG. 3. The descriptive information of the makeup method is information describing how to perform the makeup with the cosmetic. This information may be described by a text or may be shown by an image.

The transmission unit 105 according to this modified example transmits the descriptive information of the makeup method corresponding to the cosmetic determined by the determining unit 104 to the user terminal 20. The descriptive information of the makeup method is read from the product table 134 and is used. For example, if the eye shadow A is determined by the determination unit 104, the descriptive information of the makeup method associated with the name of the eye shadow A is read and then transmitted.

The descriptive information of the makeup method transmitted from the server 10 reaches the user terminal 20 via the network 2. The reception unit 204 receives the descriptive information of the makeup method. The output unit 205 outputs the descriptive information of the makeup method received by the receiver 204. For example, the output unit 205 displays the descriptive information of the makeup method on the display unit 25

For example, in the first embodiment, the descriptive information of the makeup method may be included in the purchase screen 35 shown in FIG. 10. In the second embodiment, the descriptive information of the makeup method may be included in the screen 43 or purchase screen 44 shown in FIG. 15. As another example, a video performing the makeup on the user's face image according to this makeup method may be generated. This video is included in, for example, the screen 43 shown in FIG. 15. Accordingly, the user can know the makeup method using the cosmetic together with the information about the cosmetic corresponding to the desired color.

As another example, the descriptive information of the makeup method according to the makeup skill level of the user may be provided. In the product table 134 according to this modified example, the descriptive information of the makeup method is stored for each makeup skill level.

The transmission unit 105 according to this modified example transmits the descriptive information of the makeup method corresponding to the cosmetic determined by the determining unit 104 and the makeup skill level of the user to the user terminal 20. The makeup skill level is stored in the user table 133. For example, if the eye shadow A is determined by the determination unit 104 and the makeup skill level of the user is "1," the descriptive information of the makeup method associated with the name of eye shadow A and the skill level "1" is read from the product table 134 and is then transmitted.

The descriptive information of the makeup method transmitted from the server 10 reaches the user terminal 20 via the network 2. The reception unit 204 receives the descriptive information of the makeup method. The output unit 205 outputs the descriptive information of the makeup method received by the receiver 204. For example, as described above, the output unit 205 displays the descriptive information of the makeup method on the display unit 25. According to this modified example, the user can know the makeup method according to his or her makeup skill level.

3-4. Modified Example 4

In the first embodiment and the second embodiment described above, a makeup tool used for performing makeup using a cosmetic may be recommended together with the cosmetic. The storage unit 13 according to this modified example stores a product table 135 instead of the product table 131.

FIG. 22 is a diagram showing an example of a product table 135. The product table 135 includes names, image data and product information of makeup tools corresponding to cosmetics in addition to names, image data and product information of the cosmetics stored in the product table 131 shown in FIG. 3. The name of the makeup tool is information for identifying the makeup tool. The image data of the makeup tool are data representing an image of the makeup tool. This image is, for example, a photograph of the makeup tool. The product Information of the makeup tool is detailed information of the makeup tool. For example, the product information includes a brand name or price of the makeup tool.

The transmission unit 105 transmits information about a makeup tool corresponding to a cosmetic determined by the determination unit 104 to the user terminal 20. The information about the makeup tool includes the name, image data and product information of the makeup tool. For example, when an eye shadow A is determined by the determination unit 104, the name, image data and product information of a makeup tool that is stored in association with the eye shadow A are read from the products table 135 and are transmitted.

The information about the makeup tool transmitted from the server 10 reaches the user terminal 20 via the network 2. The reception unit 204 receives the information about the makeup tool. The output unit 205 outputs the information about the makeup tool received by the receiver 204. For example, the output unit 205 displays the information about the makeup tool on the display unit 25.

For example, in the first embodiment, the information about the makeup tool may be included in the purchase screen 35 shown in FIG. 10. In the second embodiment, the information about the makeup tool may be included in the purchase screen 44 shown in FIG. 15. Moreover, the purchase screens 35 and 44 may include a purchase button to be used for an operation of performing the purchase of the makeup tool. According to this modified example, the user can easily purchase the makeup tool required to use the cosmetic.

3-5. Modified Example 5

In the first embodiment and the second embodiment described above, when the user's face image 341 or 431 on which makeup has been performed is generated, the color of the face image 341 or 431 may be changed according to a state of the user's skin. The user terminal 20 according to this modified example includes the same functions as the extraction unit and the determination unit described in the above-described modified example 1 in addition to the functions shown in FIG. 8, The extraction unit extracts the color of the skin from the user's face image by the image recognition. The determination unit determines a state of the user's skin in accordance with the skin color extracted by the extraction unit. The state of the skin includes, for example, a skin color, uneven, or smoothness. The generation unit 202 changes the color of the face image 341 or 431 generated in the above-described color simulation processing or makeup simulation processing in accordance with the state of the skin determined by the determination unit. For example, when the color of the skin is dull, the color of the face image 341 or 431 is changed to allow a makeup color to look bad by a method such as lowering saturation of the makeup color. Accordingly, the makeup color of the face image 341 or 431 generated in the color simulation processing or makeup simulation processing can be similar to a makeup color of a case that the user actually performs the makeup.

As another example, a brightness or light condition of the face image 341 or 431 may be changed according to a usage scene such as morning, noon, evening, outdoor, or indoor at a time when the user's face image 341 or 431 on which the makeup has been performed is generated. Accordingly, the makeup fitting the various scenes can be simulated.

3-6. Modified Example 6

A combination of the functions of the cosmetic information provision system 1 and the executive entities of the functions is not limited to the first embodiment and the second embodiment described above. For example, a part of the functions of the user terminal 20 may be included in the server 10. For example, the server 10 may include the generation unit 202. Further, the server 10 may generate the purchase screen 353 or 442. In this case, the screen data representing the generated purchase screen 353 or 442 are transmitted from the server 10 to the user terminal 20.

As another example, the user terminal 20 may include all functions of the server 10. In this case, the user terminal 20 functions as an example of a "cosmetic information providing apparatus" according to the present invention. Further, there is no need to provide the server 10.

As another example, at least a part of the functions of the user terminal 20 or at least a part of the function of the server 10 may be included in an apparatus other than the server 10 and the user terminal 20.

3-7. Modified Example 7

The present invention may be provided as a cosmetic information providing method including steps of processes performed in the cosmetics information providing system 1. Further, the present invention may be provided as a server program executed in the server 10 or a client program executed in the user terminal 20. These programs may be downloaded via the network 2 such as the internet. Further, these programs may be provided by being recorded on a computer-readable recording medium such as a magnetic recording medium (such as a magnetic tape or a magnetic disk), an optical recording medium (such as an optical disc), a magneto-optical recording medium, or a semiconductor memory.

What is claimed is:

1. A cosmetic information providing system comprising one or more processors comprising:
   a first acquisition unit that acquires a first image representing a face of a person on which makeup with a first color has been performed, the person being different from a user;
   an extraction unit that extracts the first color from the acquired first image;
   a first calculation unit that calculates similarity between the extracted first color and a second color of makeup using a predetermined cosmetic based on a color table;
   a determination unit that determines a cosmetic where the similarity calculated by the first calculation unit is higher than a threshold;
   an output unit that outputs information for identifying the determined cosmetic;
   a second acquisition unit that acquires a second image representing a face of the user:
   a generation unit that generates a third image representing a face of the user on which makeup using the determined cosmetic has been performed by using the acquired second image, wherein the output unit outputs the third image;
   a third acquisition unit that acquires a fourth image representing a face of the user on which makeup with a third color has been performed using the determined cosmetic after the output unit outputs the information;
   a second calculation unit that calculates a correction value in accordance with a difference between the first color and the third color;

a correction unit that when the first acquisition unit acquires a fifth image representing a face of the user on which makeup with a fourth color has been performed, corrects the fourth color using the calculated correction value; and wherein the determination unit determines a cosmetic corresponding to the corrected fourth color.

2. The cosmetic information providing system according to claim 1, wherein the extraction unit extracts a color of a skin from the acquired first image, and wherein the first calculation unit calculates the similarity between a color obtained by superimposing the extracted first color on the extracted color of the skin and the second color.

3. The cosmetic information providing system according to claim 1, further comprising a providing unit that gives a priority to the cosmetic where the calculated similarity is higher than the threshold based on addition information about the predetermined cosmetic or a user, wherein the determination unit determines a predetermined number of cosmetics in an order of the highest priority.

4. A cosmetic information provision apparatus comprising one or more processors comprising:

a first acquisition unit that acquires a first image representing a face of a person on which makeup with a first color has been performed, the person being different from a user;

an extraction unit that extracts the first color from the acquired first image;

a first calculation unit that calculates similarity between the extracted first color and a second color of makeup using a predetermined cosmetic based on a color table;

a determination unit that determines a cosmetic where the similarity calculated by the first calculation unit is higher than a threshold;

an output unit that outputs information for identifying the determined cosmetic;

a second acquisition unit that acquires a second image representing a face of the user:

a generation unit that generates a third image representing a face of the user on which makeup using the determined cosmetic has been performed by using the acquired second image, wherein the output unit outputs the third image;

a third acquisition unit that acquires a fourth image representing a face of the user on which makeup with a third color has been performed using the determined cosmetic after the output unit outputs the information;

a second calculation unit that calculates a correction value in accordance with a difference between the first color and the third color;

a correction unit that when the first acquisition unit acquires a fifth image representing a face of the user on which makeup with a fourth color has been performed, corrects the fourth color using the calculated correction value; and wherein the determination unit determines a cosmetic corresponding to the corrected fourth color.

5. A cosmetic information providing method comprising:

acquiring a first image representing a face of a person on which makeup with a first color has been performed, the person being different from a user;

extracting the first color from the acquired first image;

calculating similarity between the extracted first color and a second color of makeup using a predetermined cosmetic based on a color table;

determining a cosmetic where the similarity calculated by the first calculation unit is higher than a threshold;

outputting information for identifying the determined cosmetic;

acquiring a second image representing a face of the user;

generating a third image representing a face of the user on which makeup using the determined cosmetic has been performed by using the acquired second image;

outputting the third image;

acquiring a fourth image representing a face of the user on which makeup with a third color has been performed using the determined cosmetic after the output unit outputs the information;

calculating a correction value in accordance with a difference between the first color and the third color;

when acquiring a fifth image representing a face of the user on which makeup with a fourth color has been performed, correcting the fourth color using the calculated correction value; and determining a cosmetic corresponding to the corrected fourth color.

6. A program stored on a non-transitory computer-readable recording medium for causing a computer to execute a cosmetic information comprising:

acquiring a first image representing a face of a person on which makeup with a first color has been performed, the person being different from a user;

extracting the first color from the acquired first image;

calculating similarity between the extracted first color and a second color of makeup using a predetermined cosmetic based on a color table;

determining a cosmetic where the similarity calculated by the first calculation unit is higher than a threshold;

outputting information for identifying the determined cosmetic;

acquiring a second image representing a face of the user;

generating a third image representing a face of the user on which makeup using the determined cosmetic has been performed by using the acquired second image;

outputting the third image;

acquiring a fourth image representing a face of the user on which makeup with a third color has been performed using the determined cosmetic after the output unit outputs the information;

calculating a correction value in accordance with a difference between the first color and the third color;

when acquiring a fifth image representing a face of the user on which makeup with a fourth color has been performed, correcting the fourth color using the calculated correction value; and determining a cosmetic corresponding to the corrected fourth color.

* * * * *